US012699223B2

(12) United States Patent
Kuo et al.

(10) Patent No.:     US 12,699,223 B2
(45) Date of Patent:          Aug. 4, 2026

(54) SEMICONDUCTOR DEVICES WITH EMBEDDED SILICON LENS

(71) Applicant: Taiwan Semiconductor Manufacturing Company, Ltd., Hsinchu (TW)

(72) Inventors: Feng-Wei Kuo, Zhudong Township (TW); Wen-Shiang Liao, Toufen Township (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 68 days.

(21) Appl. No.: 17/752,640

(22) Filed: May 24, 2022

(65) Prior Publication Data

US 2023/0408769 A1      Dec. 21, 2023

(51) Int. Cl.
| | |
|---|---|
| *G02B 6/12* | (2006.01) |
| *G02B 6/124* | (2006.01) |
| *G02B 6/136* | (2006.01) |
| *G02B 6/42* | (2006.01) |
| *G02B 6/43* | (2006.01) |
| G02B 6/34 | (2006.01) |

(52) U.S. Cl.
CPC ......... *G02B 6/12004* (2013.01); *G02B 6/124* (2013.01); *G02B 6/4204* (2013.01); *G02B 6/43* (2013.01); *G02B 2006/12173* (2013.01); *G02B 2006/12176* (2013.01); *G02B 6/136* (2013.01); *G02B 6/34* (2013.01); *G02B 6/4214* (2013.01)

(58) Field of Classification Search
CPC ............ G02B 6/12002; G02B 6/12004; G02B 6/42–4209; G02B 6/43; G02B 6/124; G02B 6/136; G02B 6/34; G02B 6/4204; G02B 6/4214; G02B 2006/12173; G02B 2006/12176
See application file for complete search history.

(56) References Cited

U.S. PATENT DOCUMENTS

| | | | | |
|---|---|---|---|---|
| 9,285,554 B2 * | 3/2016 | Doany | ..................... | G02B 6/30 |
| 10,267,990 B1 * | 4/2019 | Yu | ........................... | H05K 1/181 |
| 12,282,184 B1 * | 4/2025 | Huang | ................. | G02B 6/0055 |
| 2006/0239605 A1 * | 10/2006 | Palen | ..................... | G02B 6/423 |
| | | | | 385/33 |
| 2007/0297729 A1 * | 12/2007 | Kodama | .............. | H05K 1/0274 |
| | | | | 385/94 |
| 2013/0182998 A1 * | 7/2013 | Andry | ................. | G02B 6/4204 |
| | | | | 385/33 |
| 2013/0209026 A1 * | 8/2013 | Doany | ..................... | G02B 6/32 |
| | | | | 438/32 |
| 2014/0177995 A1 * | 6/2014 | Mohammed | ......... | G02B 6/1228 |
| | | | | 385/79 |

(Continued)

*Primary Examiner* — Daniel Petkovsek
(74) *Attorney, Agent, or Firm* — Foley & Lardner LLP

(57) ABSTRACT

A semiconductor device includes a silicon substrate having a first region and a second region. The semiconductor device includes a silicon lens formed in the first region and along a surface of the silicon substrate on a first side of the silicon substrate. The semiconductor device includes a photonic die disposed in the first region and on a second side of the silicon substrate, the second side being opposite to the first side. The semiconductor device includes a waveguide disposed on the second side of the silicon substrate and having a grating coupler.

20 Claims, 15 Drawing Sheets

(56)  References Cited

U.S. PATENT DOCUMENTS

| | | | |
|---|---|---|---|
| 2014/0294342 A1* | 10/2014 | Offrein | G02B 6/4214 |
| | | | 385/14 |
| 2015/0037044 A1* | 2/2015 | Peterson | G02B 6/4292 |
| | | | 398/135 |
| 2015/0370015 A1* | 12/2015 | Aoki | G02B 6/423 |
| | | | 385/14 |
| 2018/0335566 A1* | 11/2018 | Menezo | G02B 6/34 |
| 2021/0088723 A1* | 3/2021 | Yu | G02B 6/12004 |
| 2021/0333491 A1* | 10/2021 | Menezo | G02B 6/34 |
| 2022/0037566 A1* | 2/2022 | Chen | H10H 20/852 |
| 2024/0159969 A1* | 5/2024 | Doi | G02B 6/428 |

* cited by examiner

602 — Form electrical die over 1st surface of 1st substrate

604 — Form Si-based lens over 2nd surface of the 1st substrate

606 — Form photonic die over 1st surface of 2nd substrate

608 — Attach the electrical die to the photonic die

610 — Attach the electrical die & photonic die to package substrate

600

702 — Form 1st mask over the 2nd surface of the 1st substrate

704 — Etch the 1st substrate using the 1st mask

706 — Form 2nd mask adjacent the 1st mask

708 — Etch the 1st substrate using the 1st & 2nd masks

710 — Round staircase profile on the 2nd surface

604

SEMICONDUCTOR DEVICES WITH EMBEDDED SILICON LENS

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
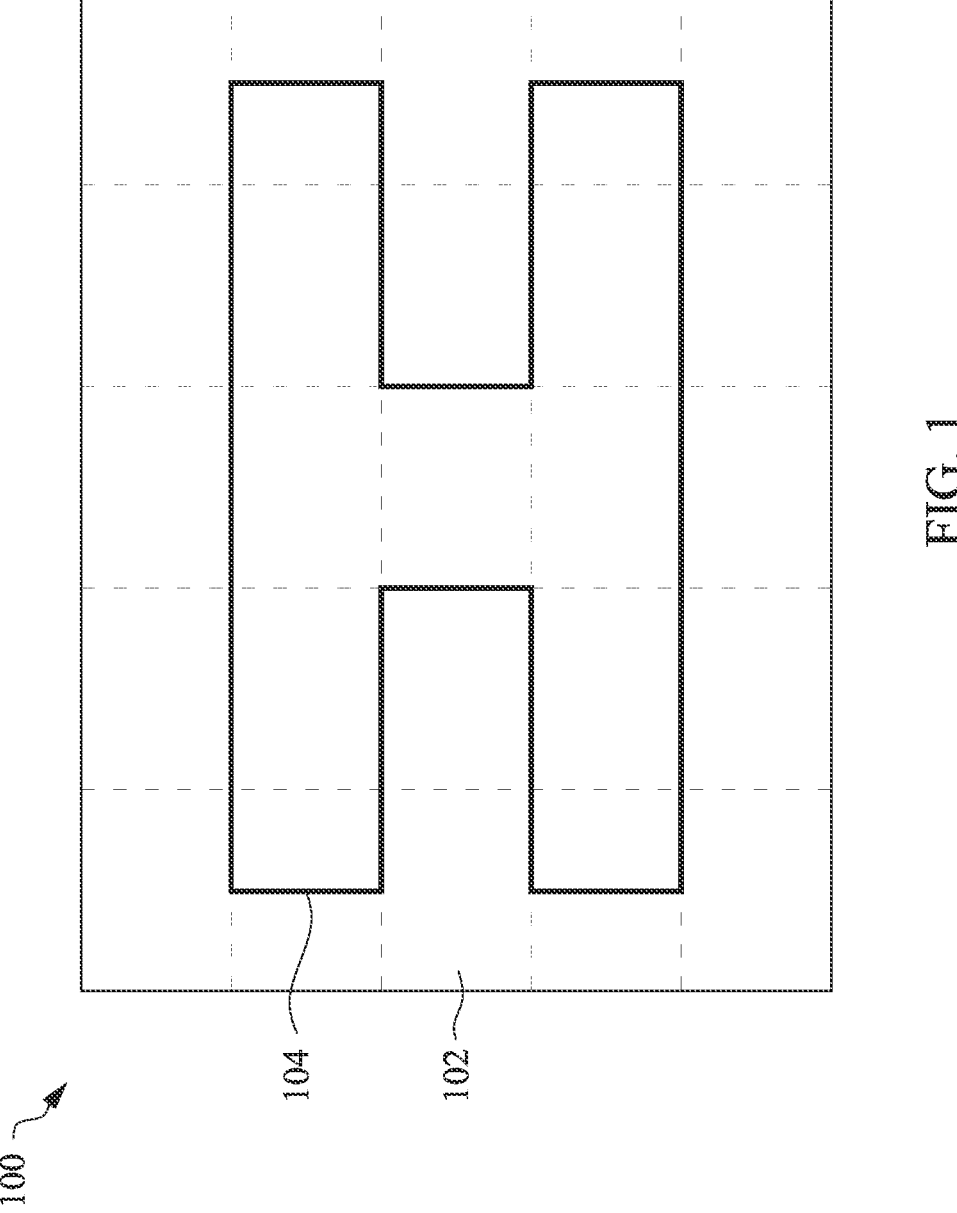
FIG. 1 illustrates a multi-chip system including a number of sites, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides various embodiments of a three-dimensional (3D) packages including both an optical device and an electrical device which may be electrically coupled to each other, and the method of forming the same. In accordance with various embodiments, the package, as disclosed herein, embeds or otherwise includes a silicon-based (e.g., silicon, silicon nitride) lens optically coupled to the optical device. Such a silicon-based lens can serve as an optical input/output (I/O) for the optical device. For example, with configurable dimensions and profiles, the silicon-based lens can collimate a received optical source and generate a focal point for the optical source at a guided-mode resonance component (e.g., a grating coupler) of the optical device. As such, the optical device can have a significantly improved coupling efficiency. Further, with the focal point adjusted right at the grating coupler, a beam size of the optical source can be optimized (e.g., minimized), which can in turn reduce a size of the grating coupler. Accordingly, an area occupied by the optical device may be reduced, which may advantageously spare more area to incorporate more high-performance (e.g., electrical) devices in the package.

FIG. 1 illustrates a multi-chip system 100, in accordance with various embodiments. The multi-chip system 100 is, e.g., a high performance computing (HPC) system, and includes a plurality of sites 102, each of which may be a separate computing system. Each of the sites 102 may be formed as a (e.g., three-dimensional (3D)) semiconductor package, for example, formed on a common package substrate. Although the system 100 shown in FIG. 1 has twenty sites 102, it should be understood that the system 100 can include any number of sites 102 while remaining within the scope of present disclosure.

The sites 102 are interconnected by an optical pathway 104, which allows the separate computing systems of the sites 102 to communicate with each other. For example, the optical pathway 104 may be a closed loop (or ring) that connects to each site 102 of the multi-chip system 100. As such, each site 102 may communicate with any of the other sites 102 via the optical pathway 104. In an embodiment, the optical pathway 104 includes a plurality of waveguides, and each waveguide connects two of the sites 102 in a peer-to-peer manner. In some embodiments, the optical pathway 104 is a silicon photonic interconnect, although other types of optical pathways could be used.

Figure 2:
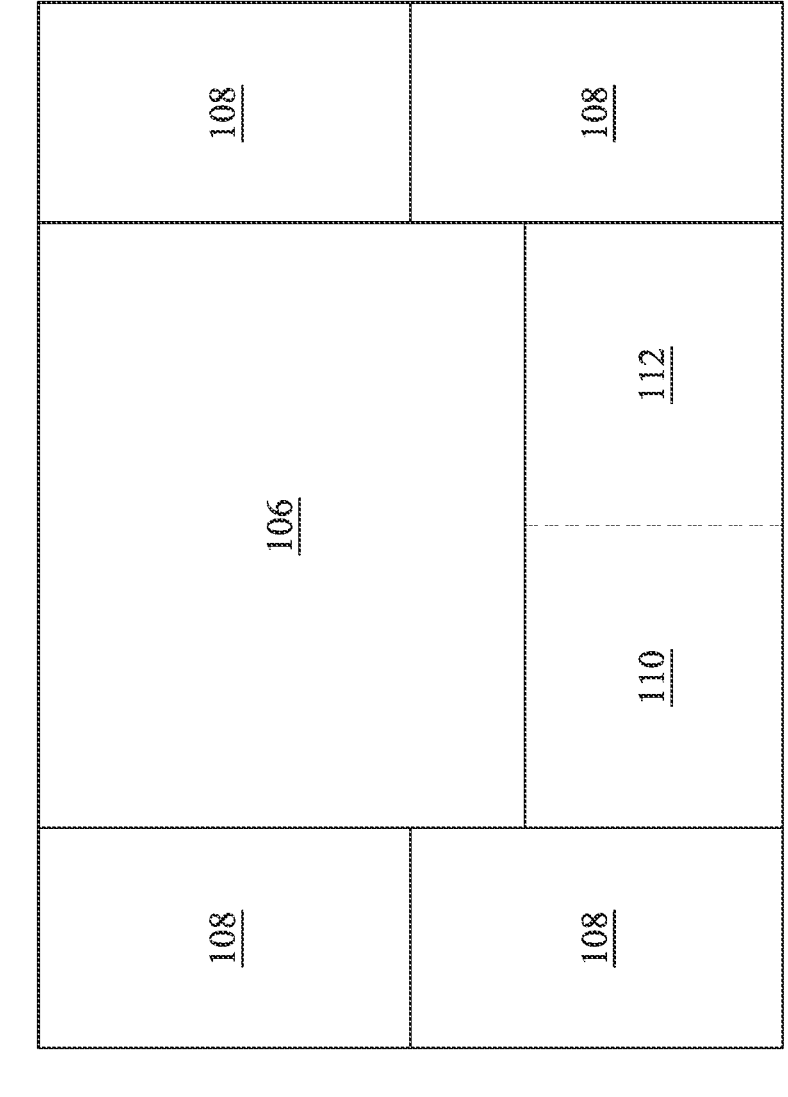
FIG. 2 illustrates an example arrangement of components of a site of the multi-chip system of FIG. 1, in accordance with some embodiments.

Referring to FIG. 2, an example layout or otherwise arrangement of components (e.g., dies, devices, etc.) in each site 102 is shown, in accordance with various embodiments.

As a non-limiting example shown in FIG. 2, each site 102 may include a processor die 106, memory dies 108, an electronic die (an implementation of the electrical device) 110, and a photonic die (an implementation of the optical device) 112. The optical pathway 104 extends under one or more components of each site 102, but at least extends under the photonic die 112 of each site 102. The sites 102 are interconnected by an electrical pathway (not shown in FIG. 1 or 2, but will be described below).

The processor die 106 may be a central processing unit (CPU), graphics processing unit (GPU), application-specific integrated circuit (ASIC), or the like. The memory dies 108 may be volatile memory such as dynamic random-access memory (DRAM), static random-access memory (SRAM), or the like. In the embodiment shown, each site 102 includes one processor die 106 and four memory dies 108, although it should be appreciated that each site 102 may include more or less memory dies 108.

The photonic die 112 can transmit, receive, convert, modulate, demodulate, or otherwise process optical signals. For example, the photonic die 112 can convert electrical signals from the processor die 106 to optical signals, and convert optical signals to electrical signals. The photonic die 112 can communicate such optical signals through the optical pathway 104 (FIG. 1) with one or more other photonic dies. According to various embodiments of the present disclosure, the photonic die 112 can receive the optical signals from a silicon-based (e.g., silicon-based) lens embedded onto the corresponding site 102, and transmit and/or receive the optical signals via one or more waveguides of the optical pathway 104. As will be discussed in further detail below, the silicon-based lens may be optically coupled to the optical pathway 104 by edge or grating coupling (e.g., via a grating coupler). Such optical signals received through the silicon-based lens may include a test signal configured to test the corresponding photonic die 112, the optical pathway 104, etc., and/or a carrier (e.g., laser) signal. Accordingly, the photonic die 112 is responsible for the input/output (I/O) of optical signals to/from the optical pathway 104. In some embodiments, the optical pathway 104, or at least a portion of it, may be integrated into the photonic die 112.

In various embodiments, the photonic die 112 may be a photonic integrated circuit (PIC), and the electronic die 110 includes electronic circuits needed to interface the processor die 106 with the photonic die 112. For example, the electronic die 110 may include controllers, transimpedance amplifiers, and the like. The electronic die 110 controls high-frequency signalling of the photonic die 112 according to electrical signals (digital or analog) received from the processor die 106. The electronic die 110 may be an electronic integrated circuit (EIC). Although the processor die 106, memory dies 108, and electronic die 110 are illustrated as being separate dies in the non-limiting example of FIG. 2, it should be appreciated that the sites 102 could each be a system-on-chip (SoC) or a system-on-integrated-circuit (SoIC) device/package. As such, the processing, memory, and/or electronic control functionality may be integrated on the same die or the same substrate.

Figure 3:
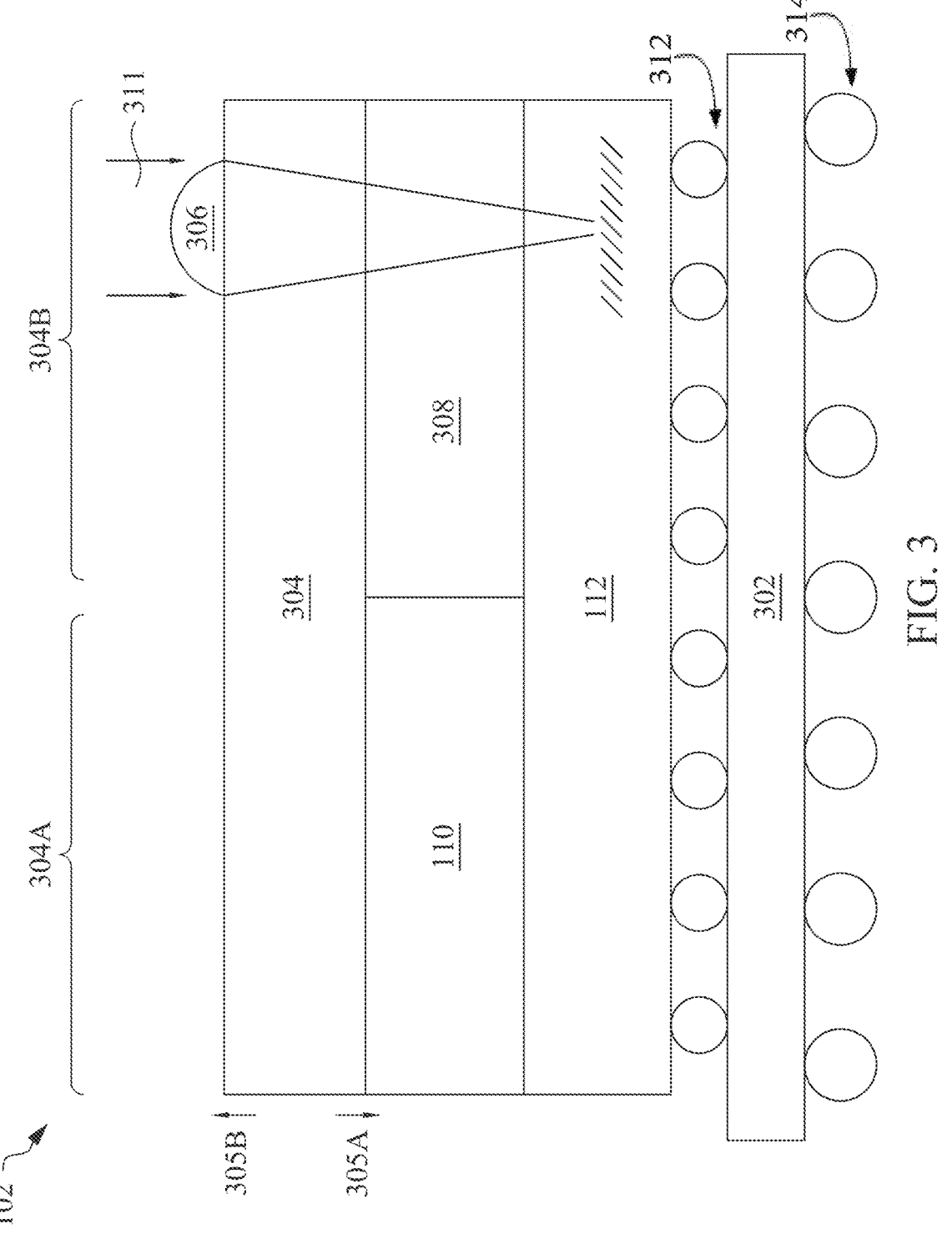
FIG. 3 illustrates a cross-sectional view of a portion of the site of FIG. 1, in accordance with some embodiments.

FIG. 3 illustrates a cross-sectional view of a portion of one of the sites 102, in accordance with various embodiments. For example, the portion of the site 102 shown in FIG. 3 includes an electrical die 110 attached to or otherwise stacked over an optical die 112, and such two stacked dies are disposed over a package substrate 302. The cross-sectional view of the site 102, in FIG. 3, is simplified as a schematic diagram, while further details of the site 102 will be shown and discussed in FIG. 4. Further, it should be appreciated that over the package substrate 302, the site 102 can include any of various other dies attached thereto, for example, one or more memory dies 108, one or more processor dies 106, etc., while remaining within the scope of present disclosure.

The electrical die 110 is formed over a substrate 304. The substrate 304 may be a semiconductor substrate, such as a bulk semiconductor or the like, which may be doped (e.g., with a p-type or an n-type dopant) or undoped. The substrate 304 may be a wafer, such as a silicon wafer. Other substrates, such as a multi-layered or gradient substrate may also be used. In some embodiments, the semiconductor material of the substrate 304 may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In an embodiment, the substrate 304 is a silicon wafer, e.g., a 12 inch silicon wafer.

In some embodiments, the substrate 304 may be referred to as having a front side or surface 305A, and a back side or surface 305B, as shown. Generally, the electrical die 110 includes a number of device features or structures (e.g., transistors) formed along the front surface 305A, and a number of conductive features (sometimes referred to as frontside interconnect structures) formed over these device structures on the front side 305A. However, it should be understood that the electrical die 110 can include a number of other conductive features (sometimes referred to as backside interconnect structures) formed on the back side 305B, while remaining within the scope of present disclosure.

Further, the substrate 304 has several lateral regions or areas, including but not limited to, a first region 304A and a second region 304B. In some embodiments, the electrical die 110 can be formed in the first region 304A, while in the second region 304B and on the back side 305B of the substrate 304, a silicon-based lens 306 is formed. Specifically, the silicon-based lens 306 is (e.g., vertically) aligned with a guided-mode resonance component 310 of the photonic die 112, with a dielectric layer 308 (e.g., silicon oxide, silicon nitride, a combination thereof, or the like) interposed therebetween. As a result, an optical transmission path extending from the guided-mode resonance component 310 to the silicon-based lens 306 exists. As will be shown below in FIG. 4, such an optical transmission path is free from any conductive (e.g., metal) feature, thereby substantially limiting interference from conductive features. The dimensions and profile of the silicon-based lens 306, e.g., a radius of curvature, a thickness, a diameter, an angle, etc., can be configured according to characteristics (e.g., a range of wavelengths) of the light source 311. As such, when an overlying light source 311 is received by the silicon-based lens 306, the silicon-based lens 306 can collimate the light source 311, through the substrate 304 and dielectric layer 308, at a focal point that is about a position of the guided-mode resonance component 310.

The site 102 further includes a number of (first) conductive connectors 312, and number of (second) conductive connectors 314. The first conductive connectors 312 can electrically and/or physically couple various dies (e.g., the stacked electrical die 110 and optical die 112) to the package substrate 302, and the second conductive connectors 314 can electrically and/or physically couple the package substrate 302 to one or more other devices/packages.

US 12,699,223 B2

5

Figure 4:
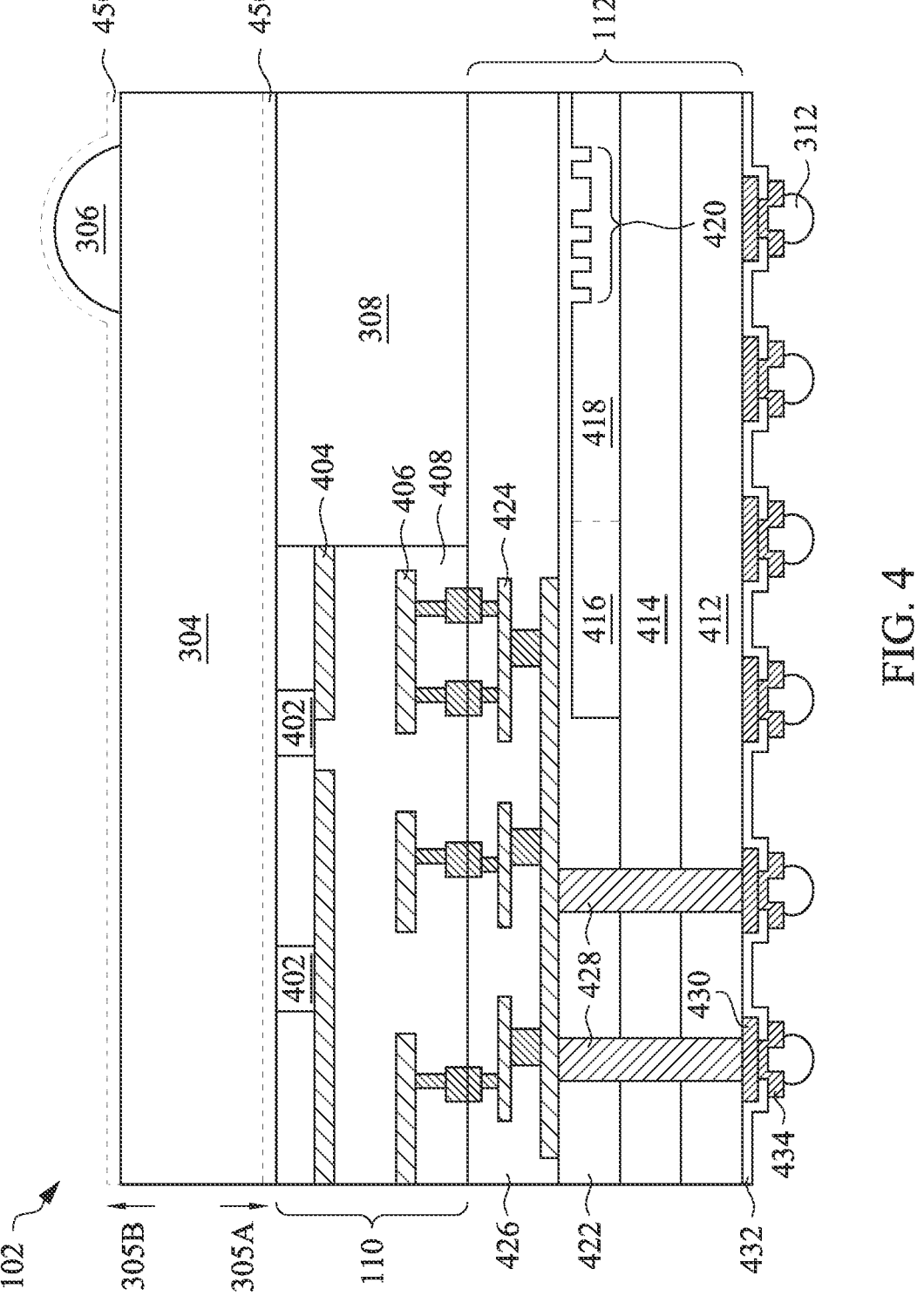
FIG. 4 illustrates a detailed, cross-sectional view of the portion of the site shown in FIG. 3, in accordance with some embodiments.

Referring next to FIG. 4, the electrical die 110 includes a number of device features 402 formed along the frontside surface of the substrate 304. The device features may be partially or fully overlaid by a dielectric layer 404. Over the dielectric layer 404 (when flipping the site 102 of FIG. 2), a number of conductive features 406 are formed in a dielectric layer 408. The dielectric layers 404 and 408 may be formed of the same material or respectively different materials selected from the group consisting of: silicon oxide, silicon nitride, a low-k dielectric material, and combinations thereof. The conductive features 406 may include lines and vias, and may be formed by a damascene process, e.g., dual damascene, single damascene, or the like. The conductive features 406 may be disposed in a number of layers or levels, sometimes referred to as metallization layers. Generally, the metallization layers disposed closet to and farthest from the device features 402 may be referred to as M0 (the bottommost metallization layer) and Mx (the topmost metallization layer), respectively. Over the Mx, a number of pads (not shown) may be formed to electrically connect the conductive features 406 therein to conductive features of the photonic die 112.

The photonic die 112 may be formed on a semiconductor-on-insulator (SOI) substrate, which includes a layer of semiconductor material formed on an insulator layer. The insulator layer may be, for example, a buried oxide (BOX) layer, a silicon oxide layer, or the like. The insulator layer is provided on a semiconductor material, typically a silicon or glass substrate. As shown in FIG. 4, layers 412 and 414 may represent such underlying semiconductor material and BOX layer, respectively.

In addition, the photonic die 112 can include a number of device features 416 (e.g., photodiodes) and a number of waveguides 418 formed in the overlaying semiconductor material (not shown). The front side (or surface) of such an overlaying semiconductor material is patterned to form the waveguide 418. Patterning the overlaying semiconductor material may be accomplished with acceptable photolithography and etching techniques. In particular, openings are etched in the overlaying semiconductor material, and remaining portions of the overlaying semiconductor material can form the waveguide 418. The BOX layer 414 may act as an etch stop layer for the etching process.

The waveguide 418 can include one or more grating couplers 420 (e.g., an implementation of the guided-mode resonance component 310), which are formed in top portions of the waveguide 418. The grating coupler 420 can allow the waveguide 418 to transmit light to or receive light from the overlying light source or optical signal source (e.g., through the lens 306). The grating coupler 420 may be formed by acceptable photolithography and etching techniques. In an embodiment, the grating coupler 420 is formed after the waveguide 418 is defined. For example, a photoresist may be formed and developed on the front side of the overlaying semiconductor material (e.g., on the waveguide 418 and in the recesses defining them). The photoresist may be patterned with openings corresponding to the grating coupler 420. One or more etching processes may be performed using the patterned photoresist as an etching mask. In particular, the front side of the overlaying semiconductor material may be etched to form recesses in the waveguide 418, thereby defining the grating coupler 420. The etching processes may be an anisotropic wet or dry etch.

The photonic die 112 further includes a dielectric layer 422 formed over the device features 416 and waveguide 418. The dielectric layer 422 may also be formed in the recesses defining the waveguide 418 and the grating coupler 420. The dielectric layer 422 may be formed of silicon oxide, silicon nitride, a combination thereof, or the like, and may be formed by chemical vapor deposition (CVD), physical vapor deposition (PVD), atomic layer deposition (ALD), a spin-on-dielectric process, the like, or a combination thereof. After formation, the dielectric layer 422 may be planarized, such as by a chemical mechanical polish (CMP) or a mechanical grinding, to avoid transfer of the pattern of the waveguide 418 to the dielectric layer 422. In an embodiment, the dielectric layer 422 is an oxide, such as silicon oxide. Due to the difference in refractive indices of the materials of the waveguide 418 and the dielectric layer 422, the waveguide 418 has high internal reflections such that light is confined in the waveguide 418, depending on the wavelength of the light and the reflective indices of the respective materials. In an embodiment, the refractive index of the material of the waveguide 418 is higher than the refractive index of the material of the dielectric layer 422.

Over the dielectric layer 422 (as shown in FIG. 2), a number of conductive features 424 are formed in a dielectric layer 426. The dielectric layers 422 and 426 may be formed of the same material or respectively different materials selected from the group consisting of: silicon oxide, silicon nitride, a low-k dielectric material, and combinations thereof. The refractive index of the material of the waveguide 418 is higher than a refractive index of the material of the dielectric layer 426. The conductive features 424 may include lines and vias, and may be formed by a damascene process, e.g., dual damascene, single damascene, or the like. The conductive features 424 may be disposed in a number of layers or levels, sometimes referred to as metallization layers. Generally, the metallization layers disposed closet to and farthest from the device features 416 may be referred to as M0 (the bottommost metallization layer) and Mx (the topmost metallization layer), respectively. Over the Mx, a number of pads (not shown) may be formed to electrically connect the conductive features 424 therein to conductive features 406 of the electrical die 110, i.e., the electrical die 110 being bonded or otherwise attached to the photonic die 112.

In some embodiments, bonding between the electrical die 110 and photonic die 112 may not include any bump structure, i.e., bumpless. However, in some other embodiments, the bonding between the electrical die 110 and photonic die 112 may be established through a number of bump structures. For example, the bonding may be hybrid bonding, fusion bonding, direct bonding, dielectric bonding, metal bonding, solder joints (e.g., microbumps), or the like.

As a non-limiting example, the electrical die 110 is bonded to the photonic die 112 by hybrid bonding. In such embodiments, covalent bonds are formed with oxide layers, such as the dielectric layer 408 of the electrical die 110 and the dielectric layer 426 of the photonic die 112. Before performing the bonding, a surface treatment may be performed on the electrical die 110. Next, a pre-bonding process may be performed, where respective pads or conductive features of the electrical die 110 and the photonic die 112 are aligned. The electrical die 110 and the photonic die 112 are pressed against together to form weak bonds. After the pre-bonding process, the electrical die 110 and the photonic die 112 are annealed to strengthen the weak bonds. During the annealing, OH bonds in the top of the dielectric layers break to form Si—O—Si bonds between the electrical die 110 and the photonic die 112, thereby strengthening the bonds.

As shown in FIG. 4, an optical transmission path extending from the grating coupler 420 to the silicon-based lens 306 exists. In various embodiments, such an optical transmission path is free from any of the conductive features 406 or conductive features 424. Stated another way, along this optical transmission path, no components formed of a conductive material exist, which can substantially limit interference induced by conductive features.

The photonic die 112 further includes a number of vias 428 extending through the dielectric layer 422, the BOX layer 414, and the underlying semiconductor material 412. The vias 428 may be formed by filling a number of openings that extend through the dielectric layer 422, the BOX layer 414, and the underlying semiconductor material 412 with a conductive material. The conductive material is formed in the openings using, for example, ECP or electroless plating. The conductive material may be a metallic material including a metal or a metal alloy such as copper, silver, gold, tungsten, cobalt, aluminum, or alloys thereof. A planarization process, such as a CHIP or mechanical grinding may be performed to remove excess conductive material along a (e.g., backside) surface of the underlying semiconductor material 412. In various embodiments, the vias 428 can electrically couple the conductive features 424 of the photonic die 112, which are electrically coupled to the conductive features 406 of the electrical die 110, to the conductive connectors 312.

Over the backside surface of the underlying semiconductor material 412, the site 102 further includes conductive pads 430, some of which can be electrically in contact with the vias 428. The conductive pads 430 may be aluminum pads or aluminum-copper pads, although other metallic pads may be used.

A passivation film 432 may be formed over the backside surface of the underlying semiconductor material 412, covering the conductive pads 430. The passivation film 432 may be formed from a dielectric material, such as silicon oxide, silicon nitride, the like, or combinations thereof. Openings are formed through the passivation film 432 to expose (e.g., central) portions of the conductive pads 430.

Underbump metallization (UBM) 434 may be formed on the conductive pads 430 and passivation film 432. The UBM 434 may be formed by forming a blanket conductive layer on the passivation film 432 and in the openings, such as by electroplating. The conductive layer may be formed from copper, a copper alloy, silver, gold, aluminum, nickel, the like, and combinations thereof. The conductive layer may be patterned to form the UBM 434.

The conductive connectors 312 are formed on the UBM 434. The conductive connectors 312 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 312 may include a conductive material such as solder, copper, aluminum, gold, nickel, silver, palladium, tin, the like, or a combination thereof. In some embodiments, the conductive connectors 312 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 312 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed over the conductive connectors 312. The metal cap layer may include nickel, tin, tin-lead, gold, silver, palladium, indium, nickel-palladium-gold, nickel-gold, the like, or a combination thereof and may be formed by a plating process.

In some embodiments, the site 102 further includes one or more anti-reflection coating (ARC) layers 450 formed on at least one of the front surface 305A or the back surface 305B of the substrate 304. The ARC layer 450 may be formed over the silicon-based lens 306. The ARC layer 450 may be implemented as a multi-layer of anti-reflective materials such as, for example, silicon, silicon nitride, silicon oxide, titanium, titanium nitride, aluminum, aluminum oxide, silicon oxynitride, combinations of these, or the like. For example, the ARC layer 450 can include a first silicon oxide (e.g., with a thickness of about 1000 angstroms (Å)), a first silicon nitride (e.g., with a thickness of about 500 Å), a second silicon oxide (e.g., with a thickness of about 2400 Å), and a second silicon nitride (e.g., with a thickness of about 2200 Å) stacked on top of one another. In such an embodiment, the ARC layer 450 (or each of its anti-reflective materials) may be formed using a deposition process such as CVD, PVD, or the like. However, any suitable material and method of formation may be used.

Figure 5:
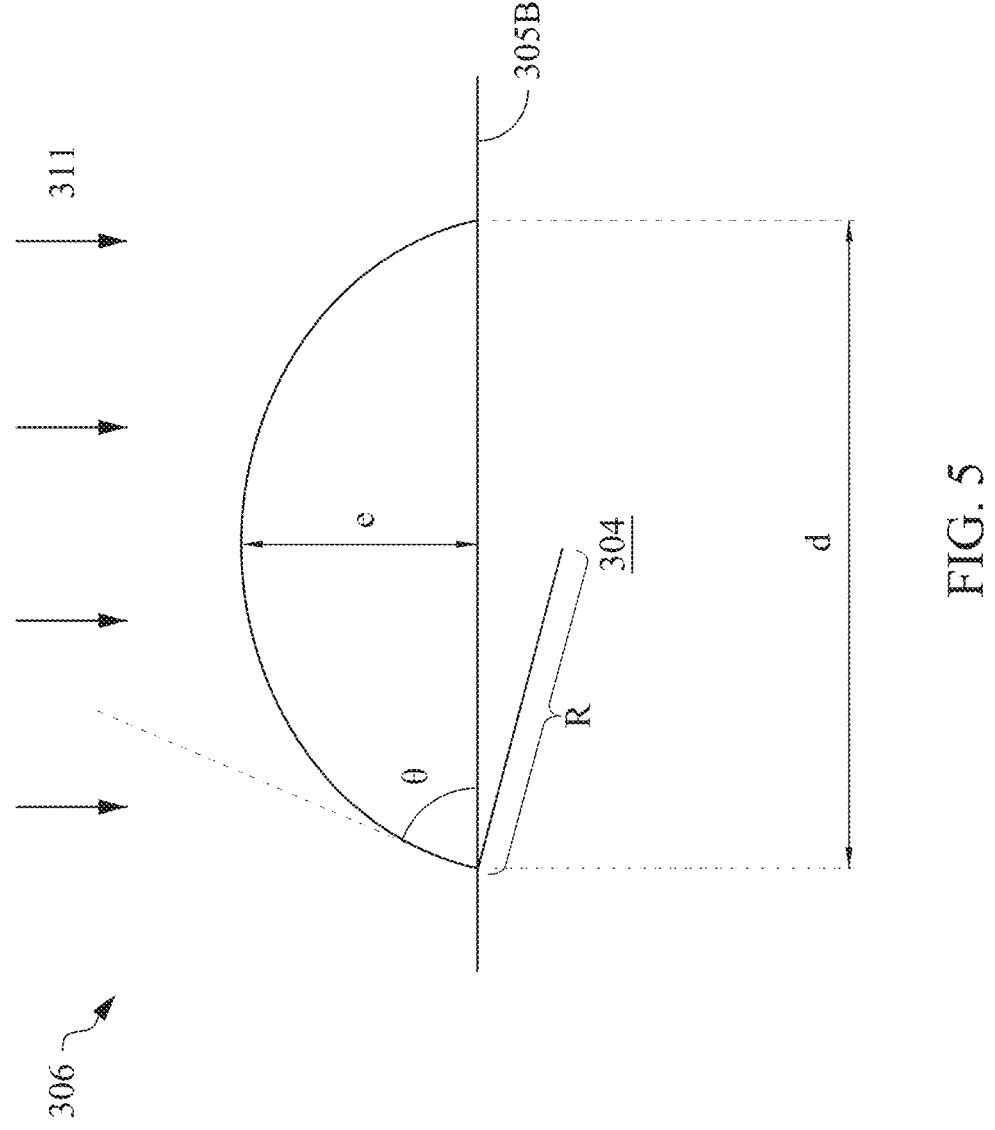
FIG. 5 illustrates a cross-sectional view of a silicon-based lens embedded in the portion of the site shown in FIG. 3, in accordance with some embodiments.

FIG. 5 illustrates an enlarged view of the silicon-based lens 306, in accordance with various embodiments. As shown in the example of FIG. 5, the silicon-based lens 306 has a a plano-convex profile, with one curved surface protruding away from the backside surface 305B and one flat surface substantially aligned with the backside surface 305B. However, it should be understood that the silicon-based lens 306 can have any of various other profiles such as, for example, a double-convex profile, a positive meniscus profile, a positive achromatic profile, etc., as long as the silicon-based lens 306 can generate a focal point at the grating coupler 420 (FIG. 4), while remaining within the scope of present disclosure.

Further, various dimensions of the silicon-based lens 306 may be configured to collimate the optical source 311 and cause it to be focused at the grating coupler 420. For example, the silicon-based lens 306 has a thickness "e" which is defined as a maximum height from the flat surface to the spherical surface, an angle "θ" which is defined as the angle between a tangential line at an end of the spherical surface and an end of the flat surface, a radius of curvature "R" of the spherical surface, and a diameter "d" of the silicon-based lens 306. As a non-limiting example, the thickness (e) may be in the range of about 1 micrometer (μm) to about 50 μm, the angle (θ) may be in the range of about 5° to about 15°, the radius (R) may be in the range of about 100 μm to about 500 μm, and the diameter (d) may be in the range of about 100 μm to about 200 μm. In some embodiments, the diameter (d) may be formed as at least 100 μm to compensate for an offset of the optical source (e.g., an optical fiber). In some embodiments, the angle (θ) may be formed in the above-identified range so as to optimize a coupling efficiency of the silicon-based lens 306. In some embodiments, the radius (R) may be formed as around 240 μm also for optimizing the coupling efficiency of the silicon-based lens 306.

Figure 6:
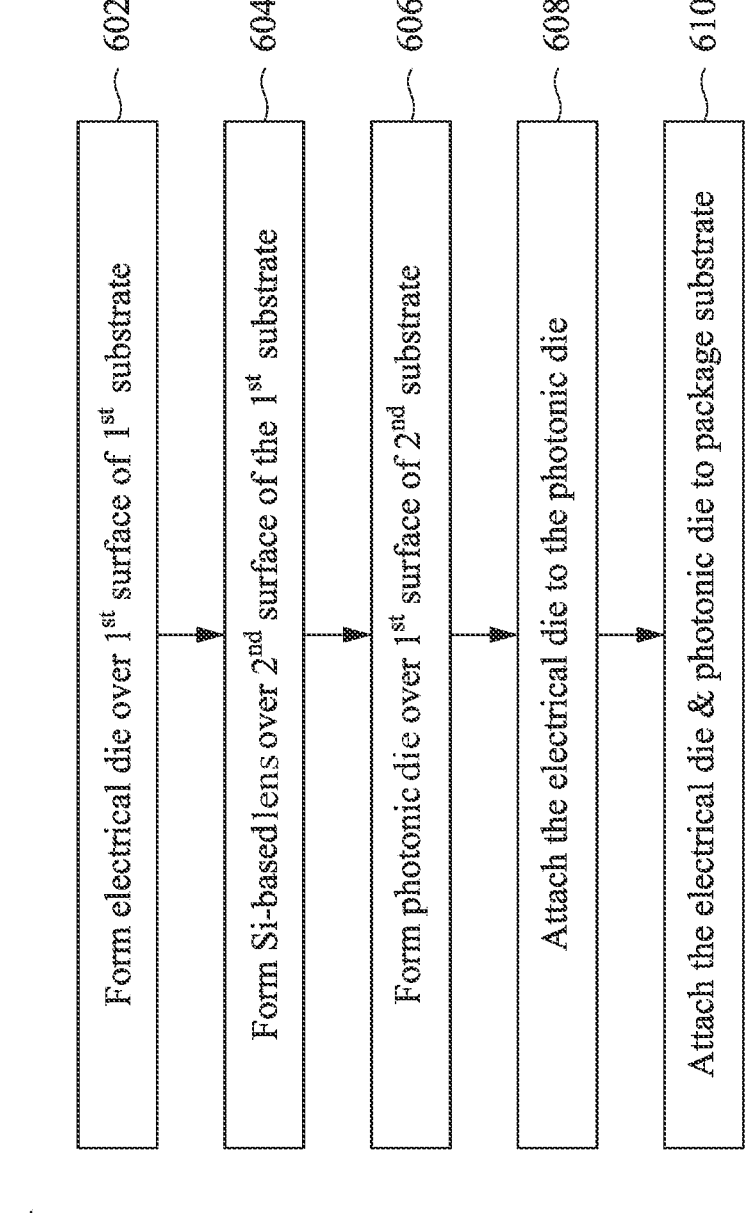
FIG. 6 illustrates an example flow chart of a method for making the portion of the site shown in FIG. 3, in accordance with some embodiments.

FIG. 6 illustrates a flow chart of an example method 600 for forming at least a portion of a semiconductor package, in accordance with some embodiments. It should be noted that the method 600 is merely an example, and is not intended to limit the present disclosure. Accordingly, it is understood that the order of operation of the method 600 of FIG. 6 can change, that additional operations may be provided before, during, and after the method 600 of FIG. 6, and that some other operations may only be described briefly herein.

Such a semiconductor package, made by the method 600, may include at least an electrical die and a photonic die operatively and physically coupled to each other, and further include a silicon-based lens operatively (e.g., optically) coupled to the photonic die. For example, the semiconductor package may include a portion of the site 102, as discussed above. Accordingly, operations of the method 600 will be discussed in conjunction with the components discussed with respect to FIGS. 3-5.

The method 600 starts with operation 602 of forming an electrical die over a first surface (side) of a first substrate. For example, an electrical die (e.g., 110), including a number of electrical device features (e.g., 402) and conductive features (e.g., 406), may be formed over the frontside surface (e.g., 305A) of a first substrate (e.g., 304). Further, the electrical die 110 may be formed in a first region of the substrate (e.g., 304A) where a silicon-based lens is not configured to be formed. In some embodiments, the first region of the substrate may be referred to as a part of the electrical die 110.

Next, the method 600 proceeds to operation 604 of forming a silicon-based lens over a second surface (side) of the first substrate. Upon forming the electrical die 110, a silicon-based lens (e.g., 306) is formed on a backside surface (e.g., 305B) of the substrate 304. Further, the silicon-based lens 306 is formed in a second region of the substrate (e.g., 304B). In some embodiments, the silicon-based lens 306 is formed with a plano-convex profile through a number of photolithography and etching processes, which will be discussed in further detail in FIG. 7.

Next, the method 600 proceeds to operation 606 of forming a photonic die over a first surface of a second substrate. Prior to, concurrently with, or subsequently to forming the electrical die 110 (and the silicon-based lens 306) on the substrate 304, a photonic die (e.g., 112) is formed over the frontside surface of a second substrate (e.g., an SOI including the underlying semiconductor material 412, BOX 414, and an overlaying semiconductor material). In some embodiments, the photonic die 112 includes a number of optical device features (e.g., 416), a number of waveguides (e.g., 418) with at least a grating coupler (e.g., 420), and a number of conductive features (e.g., 424).

Next, the method proceeds to operation 608 of attaching the electrical die to the photonic die. Continuing with the same example, upon forming the photonic die 112 and the electrical die 110, the two dies may attach to each other through various bonding techniques such as, for example, hybrid bonding, fusion bonding, direct bonding, dielectric bonding, metal bonding, solder joints (e.g., microbumps), or the like. In some embodiments, the electrical die 110 may be bonded to the photonic die 112, with the conductive features 406 (of the electrical die 110) facing the conductive features 424 (of the photonic die 112). Stated another way, the electrical die 110 can be bonded to the photonic die 112, with their respective frontside surfaces facing each other, thereby causing the silicon-based lens 306 to be disposed on a backside (opposite) surface of the substrate where the electrical die 110 is formed.

Next, the method 600 proceeds to operation 610 of attaching the electrical die and photonic die to a package substrate. Upon bonding the photonic die 112 and the electrical die 110 to each other, such bonded dies may be attached to a package substrate (e.g., 302). In some embodiments, the bonded photonic die 112 and electrical die 110 may be attached to the package substrate 302 via a number of bump structures (e.g., 312). Further, the bump structures 312 may be formed on a backside (opposite) surface of the substrate where the photonic die 112 is formed.

Figure 7:
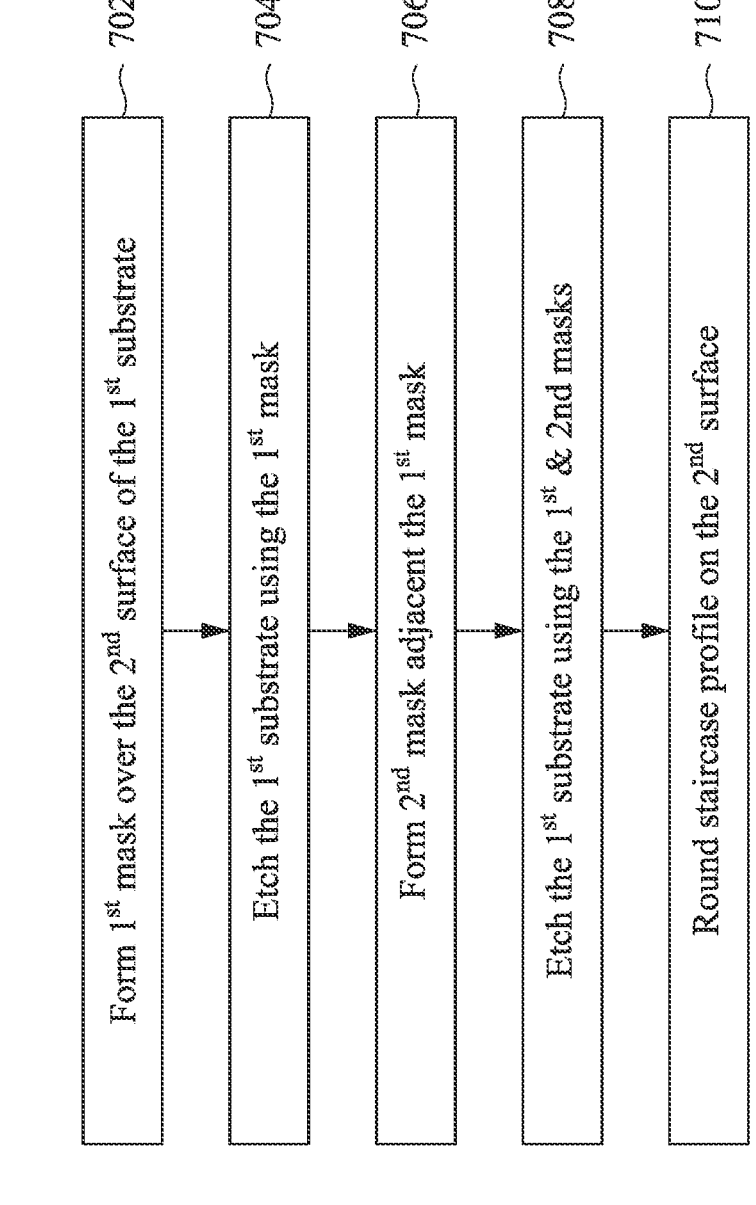
FIG. 7 illustrates an example flow chart of a method for making the silicon-based lens shown in FIG. 5, in accordance with some embodiments.

As mentioned above, operation 604 includes a number of process steps/operations to form the silicon-based lens. FIG. 7 illustrates a flow chart including such operations. In some embodiments, operations of the method 700 may be associated with cross-sectional views of a portion of an example semiconductor package 800, including an embedded silicon-based lens, at various fabrication stages as shown in FIGS. 8, 9, 10, 11, 12, 13, 14, and 15, respectively.

In brief overview, the method 700 starts with operation 702 forming a first mask over the second (back) surface/side of the first substrate. The method 700 next proceeds to operation 704 of etching the first substrate (from the back side) using the first mask. The method 700 proceeds to operation 706 of forming a second mask adjacent the first mask. The method 700 proceeds to operation 708 of etching the first substrate (from the back side) using the first and second masks. In various embodiments, operations 706 and 708 may be repeated a certain number of times until a desired staircase profile is formed on the back side of the first substrate. Following formation of the staircase profile, the method 700 proceeds to operation 710 of rounding the staircase profile to form the silicon-based lens.

Figure 8:
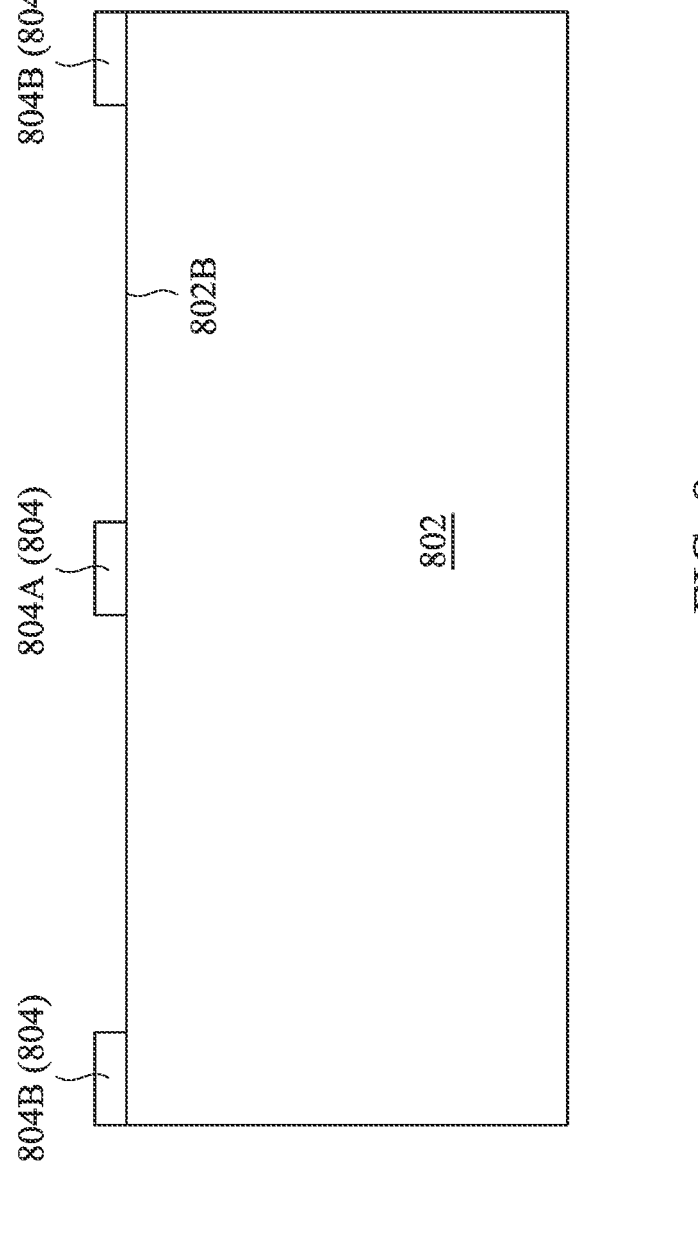
FIGS. 8, 9, 10, 11, 12, 13, 14, and 15 illustrate respective cross-sectional views of a portion of a semiconductor package during various fabrication stages, made by the method of FIG. 7, in accordance with some embodiments.

Corresponding to operation 702 of FIG. 7, FIG. 8 is a cross-sectional view of the semiconductor package 800 in which the back side of a substrate 802 (hereinafter "backside surface 802B") is overlaid by a first (e.g., hard) mask 804, in accordance with various embodiments. It should be noted that the substrate 802 of FIG. 8 (and the following figures) are shown with its upside down, and thus, the first hard mask 804 is formed on top of the substrate 802. Further, based on the method 600, one or more electrical dies may be formed prior to or subsequently to performing the method 700 (to form a silicon-based lens).

The substrate 802 may be similar to the substrate 304 discussed above. Thus, discussions of the substrate 802 will not be repeated. The first hard mask 804 may include silicon nitride. In some embodiments, the first hard mask 804 may include a number of portions overlaying different portions of the substrate 802. As shown in FIG. 8, the first hard mask 804 includes a first portion 804A and a second portion 804B. Each of the first and second portions, 804A and 804B, may be formed with a circular shape. Further, the first portion 804A may overlay a relatively central portion of the substrate 802, while the second portion 804B may surround the first portion 804A, thereby overlaying a relatively outer portion of the substrate that surrounds such a central portion.

Figure 9:
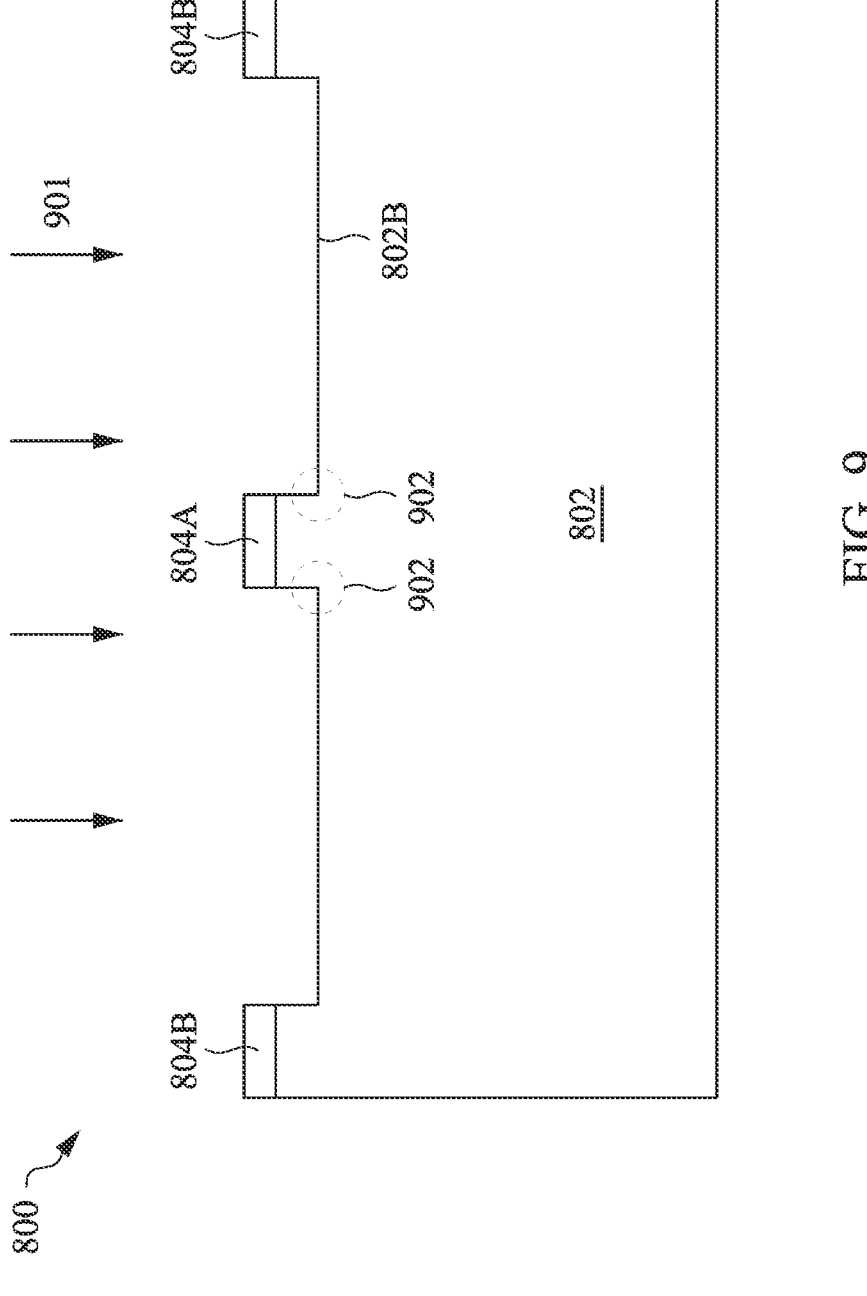

Corresponding to operation 704 of FIG. 7, FIG. 9 is a cross-sectional view of the semiconductor package 800 in which a first etching process 901 is performed on the backside surface 802B using the first hard mask 804, in accordance with various embodiments. The first etching process 901 may be a wet etching process (based on etchants such as, $NH_4OH$, $HNO_3$, or combinations thereof) or a dry etching process (based on etchants such as, $NF_3$, $F_2$, $Cl_2$, or combinations thereof). An amount of the substrate 802 etched by the etching process 901 may be controlled through a length of time of the etching process 901. As shown in FIG. 9, based on the patterns of the first hard mask 804, the backside surface 802B may present a donut shape (when viewed from the top), in which the donut is presented as a recessed portion with respect to a remaining portion that is overlaid by the first hard mask 804. Specifically, the remaining portion and the recessed portion may form a step, e.g., 902 as indicated in FIG. 9.

Figure 10:
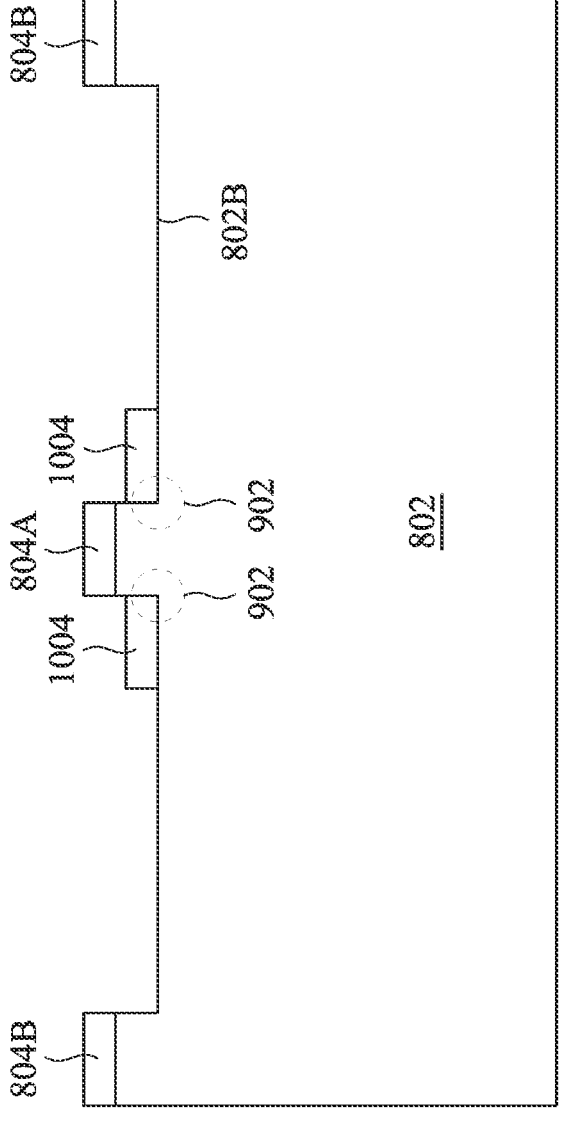

Corresponding to operation 706 of FIG. 7, FIG. 10 is a cross-sectional view of the semiconductor package 800 in which the backside surface 802B is further overlaid by a second (e.g., hard) mask 1004, in accordance with various embodiments. As shown, the second hard mask 1004 is formed adjacent the first hard mask 804, specifically, the portion 804A. For example, the second hard mask 1004 may be formed in a donut shape surrounding the step 902.

Figure 11:
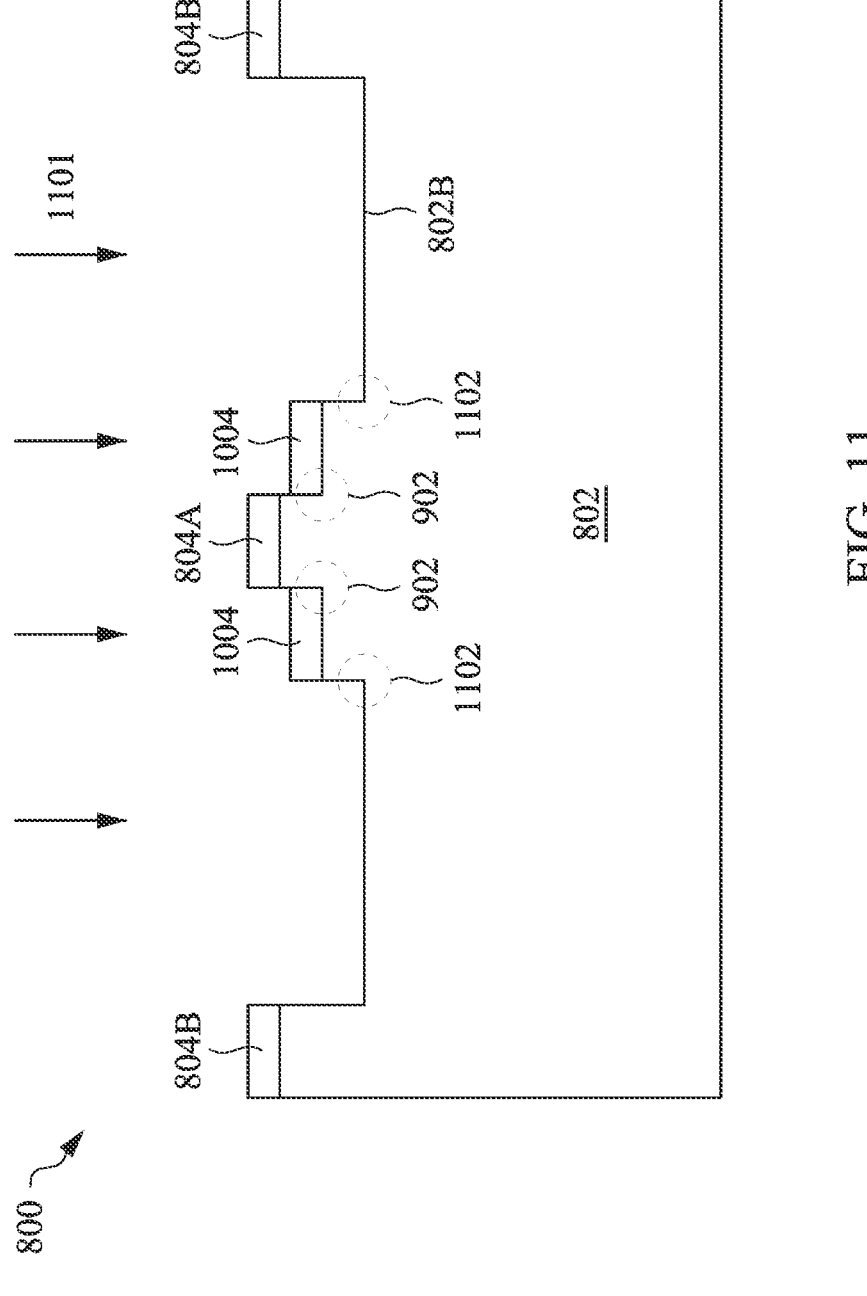

Corresponding to operation 708 of FIG. 7, FIG. 11 is a cross-sectional view of the semiconductor package 800 in which a second etching process 1101 is performed on the backside surface 802B using the first hard mask 804 and second hard mask 1004, in accordance with various embodiments. The second etching process 1101 may be a wet etching process (based on etchants such as, $NH_4OH$, $HNO_3$, or combinations thereof) or a dry etching process (based on etchants such as, $NF_3$, $F_2$, $Cl_2$, or combinations thereof). An amount of the substrate 802 etched by the etching process 1101 may be controlled through a length of time of the etching process 1101. As shown in FIG. 11, based on the patterns of the second hard mask 1004, the backside surface 802B may present another donut shape (when viewed from the top), in which the donut is presented as a recessed portion with respect to a remaining portion that is overlaid by the second hard mask 1004. Specifically, the remaining portion and the recessed portion may form another step, e.g., 1102, disposed below and surrounding the step 902, as indicated in FIG. 11.

Figure 12:
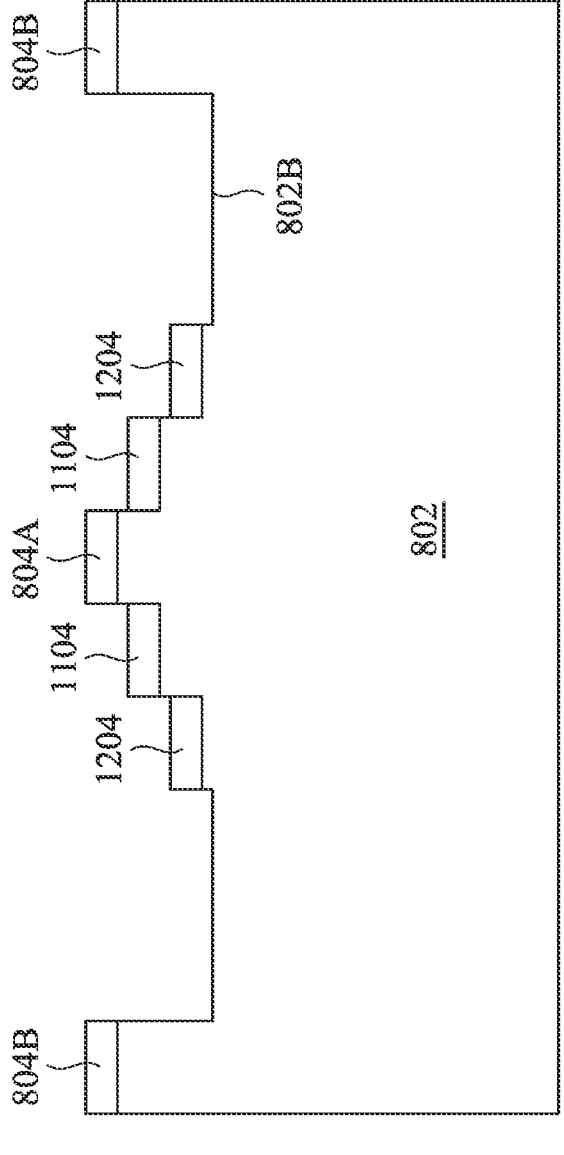
Figure 13:
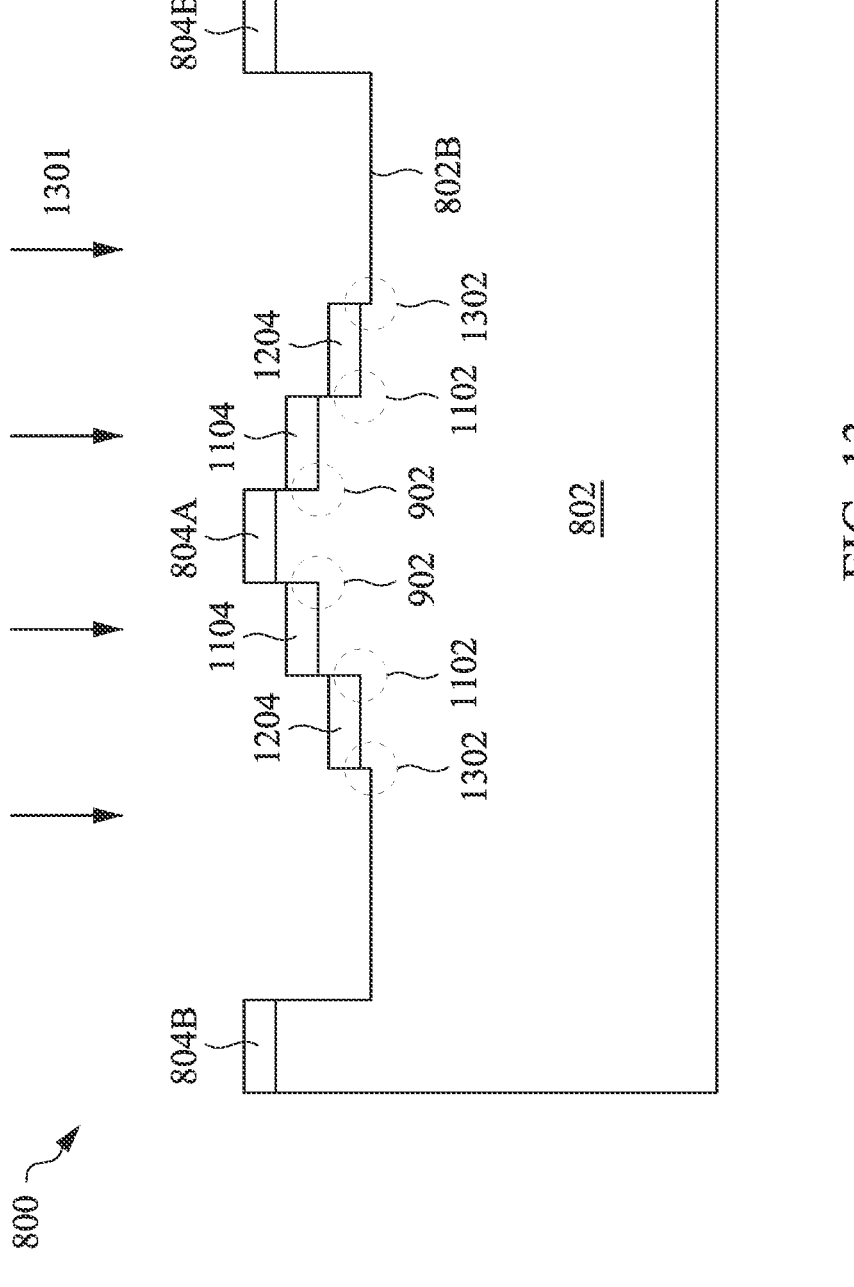
Figure 14:
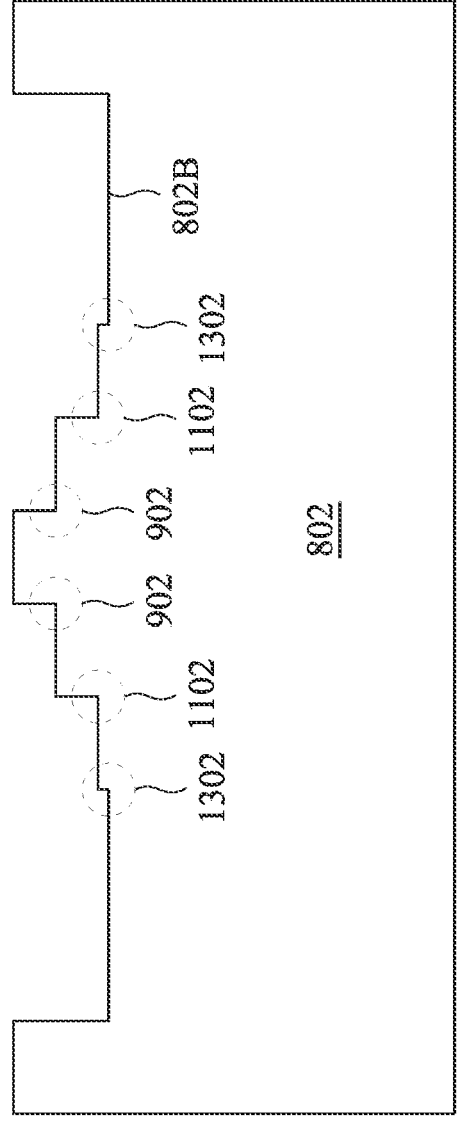
Figure 14:
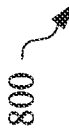

By repeating operations 706 and 708 once, yet another step 1302 can be formed on the backside surface 802B through yet another etching process 1301 using the first and second hard masks 804 and 1104, together with yet another mask 1204, which are shown in cross-sectional views of FIG. 12 and FIG. 13, respectively. Similarly, the step 1302 is formed as being disposed below and surrounding the preceding step(s), e.g., 902 and 1102. After repeating operations 706 and 708 one or more times, a corresponding number of steps can be found on the backside surface 802B, which can form a staircase profile. FIG. 14 illustrates a cross-sectional view of the semiconductor package 800 in which all the hard masks are removed, upon a desired staircase profile being formed. In some embodiments, the hard masks can be removed by a phosphoric acid solution at an elevated temperature (e.g., about 170° C.).

Figure 15:
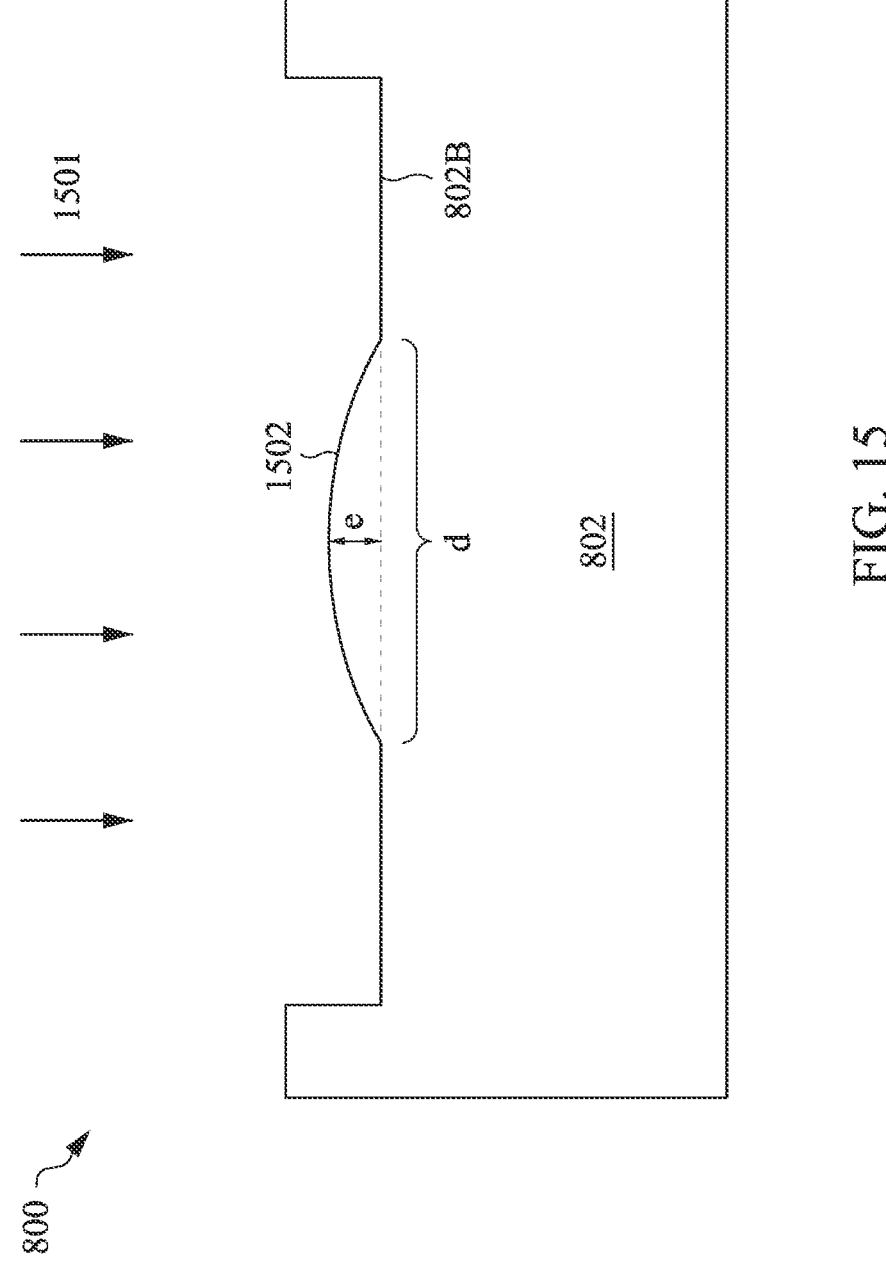

Corresponding to operation 710 of FIG. 7, FIG. 15 is a cross-sectional view of the semiconductor package 800 in which an etching process 1501 is performed to round the steps of the staircase profile, in accordance with various embodiments. The etching process 1501 may be a wet etching process. In some embodiments, the etching process 1501 can include applying at least one of ammonia solution or nitric acid solution over the backside surface 802B to round the staircase profile. For example, the etching process 1501 can etch protruding portions of the staircase profile substantially sooner than the steps (e.g., 902 to 1302). As such, such protruding portions can be rounded to form a spherical surface protruding away from the backside surface 802B, thereby forming a silicon-based lens 1502 having a plano-concave profile (e.g., 306).

In one aspect of the present disclosure, a semiconductor device is disclosed. The semiconductor device includes a silicon substrate having a first region and a second region. The semiconductor device includes a silicon lens formed in the first region and along a surface of the silicon substrate on a first side of the silicon substrate. The semiconductor device includes a photonic die disposed in the first region and on a second side of the silicon substrate, the second side being opposite to the first side. The semiconductor device includes a waveguide disposed on the second side of the silicon substrate and having a grating coupler.

In another aspect of the present disclosure, a semiconductor package is disclosed. The semiconductor package includes a substrate disposed over a package substrate. The semiconductor package includes a grating coupler disposed over the substrate. The semiconductor package includes a plurality of first conductive features disposed over the grating coupler. The semiconductor package includes an electronic die. The electronic die is disposed over the plurality of first conductive features and includes a plurality of second conductive features. The semiconductor package includes a silicon lens embedded along a first surface of a silicon substrate. The electronic die is formed along a second surface of the silicon substrate opposite to the first surface.

In yet another aspect of the present disclosure, a method for fabricating a semiconductor device is disclosed. The method includes attaching a waveguide having a grating coupler to a first side of a silicon substrate. The method includes forming a silicon lens on a second, opposite side of the silicon substrate through at least one of: (a) forming a first mask over the first side of the silicon substrate; (b) etching the silicon substrate using the first mask; (c) forming a second mask adjacent the first mask; (d) etching the silicon substrate using the first and second masks; (e) repeating the steps (c) and (d) to form a staircase profile; and (f) rounding the staircase profile.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
   a silicon substrate having a first region and a second region;
   a silicon lens formed in the first region and along a surface of the silicon substrate on a first side of the silicon substrate, wherein the silicon substrate includes a staircase profile in the first region, the staircase profile comprising at least a central portion having a first depth and a recessed portion surrounding the central portion and having a second depth less than the first depth, and wherein the staircase profile is rounded such that the rounded staircase profile defines the silicon lens;
   a dielectric layer disposed in the first region and on a second side of the silicon substrate, the second side being opposite to the first side wherein the silicon lens is formed;
   an electronic die disposed in the second region, on the second side of the silicon substrate, and adjacent to the dielectric layer;

a photonic die disposed in the first and second regions and on the second side of the silicon substrate, wherein the dielectric layer and the electronic die are interposed between the photonic die and the silicon substrate; and a waveguide disposed on the second side of the silicon substrate and having a grating coupler.

2. The semiconductor device of claim 1, wherein the grating coupler is defined by recesses in the waveguide.

3. The semiconductor device of claim 1, wherein the silicon substrate and the silicon lens are integrally formed as a one-piece.

4. The semiconductor device of claim 1, wherein the silicon lens is configured to provide a focal point at the grating coupler.

5. The semiconductor device of claim 1, wherein the grating coupler is configured to allow the waveguide to receive light through the silicon lens.

6. The semiconductor device of claim 1, wherein the photonic die comprises a plurality of conductive features.

7. The semiconductor device of claim 6, wherein an optical transmission path extending from the grating coupler to the silicon lens is free from the plurality of conductive features.

8. The semiconductor device of claim 1, further comprising:

a plurality of conductive connectors disposed on a first side of the photonic die opposite to its second side that faces the silicon substrate; and a package substrate coupled to the photonic die via at least the plurality of conductive connectors.

9. The semiconductor device of claim 1, wherein at least one of ammonia solution or nitric acid solution is applied over the surface of the silicon substrate to round the staircase profile.

10. The semiconductor device of claim 1, wherein the silicon lens is formed with a plano-convex profile.

11. The semiconductor device of claim 1, wherein the silicon lens has at least one of:

a diameter in a range of about 100 micrometers (μm) to about 200 μm, a curve radius in a range of about 100 μm to about 500 μm, an angle at edges of the silicon lens in a range of about 5 degrees to 15 degrees, or a maximum thickness in a range of about 1 μm to about 50 μm.

12. A semiconductor package, comprising:

a first substrate disposed over a package substrate;

a grating coupler disposed over the first substrate;

a plurality of first conductive features disposed in a layer over the grating coupler;

an electronic die disposed over the plurality of first conductive features and including a plurality of second conductive features;

a dielectric layer disposed over the grating coupler and adjacent to the electronic die; and a silicon lens embedded along a first surface of a silicon substrate, wherein the silicon substrate includes a staircase profile that comprises at least a central portion having a first depth and a recessed portion surrounding the central portion and having a second depth less than the first depth, and wherein the staircase profile is rounded such that the rounded staircase profile defines the silicon lens, wherein the electronic die and the dielectric layer are formed along a second surface of the silicon substrate opposite to the first surface, and wherein the electronic die and the dielectric layer are interposed between the silicon substrate and the grating coupler.

13. The semiconductor package of claim 12, wherein the silicon lens is vertically aligned with the grating coupler.

14. The semiconductor package of claim 12, wherein the silicon lens is configured to provide a focal point at the grating coupler.

15. The semiconductor package of claim 12, wherein an optical transmission path extending from the grating coupler to the silicon lens is free from any of the plurality of first conductive features or the plurality of second conductive features.

16. The semiconductor package of claim 10, further comprising:

a plurality of first conductive connectors interposed between the first substrate and the package substrate; and a plurality of second conductive connectors formed along a first surface of the package substrate opposite to its second surface that faces the first substrate.

17. The semiconductor package of claim 12, wherein the silicon lens comprises a surface having at least one region surrounding a top point, wherein the at least one region is lower than the top point of the silicon lens.

18. The semiconductor package of claim 17, wherein the silicon lens has at least one of:

a diameter in a range of about 100 micrometers (μm) to about 200 μm, a curve radius in a range of about 100 μm to about 500 μm, an angle at edges of the silicon lens in a range of about 5 degrees to 15 degrees, or a maximum thickness in a range of about 1 μm to about 50 μm.

19. A semiconductor device, comprising:

a silicon substrate having a first side and a second side opposite to the first side, wherein the silicon substrate comprises a silicon lens formed along a surface of the silicon substrate and on the first side of the silicon substrate, wherein the silicon substrate includes a staircase profile that comprises at least a central portion having a first depth and a recessed portion surrounding the central portion and having a second depth less than the first depth, and wherein the staircase profile is rounded such that the rounded staircase profile defines the silicon lens;

a dielectric layer disposed on the second side of the silicon substrate;

an electronic die disposed on the second side of the silicon substrate and adjacent to the dielectric layer; and a photonic die disposed on the dielectric layer, wherein the dielectric layer and the electronic die are interposed between the silicon substrate and the photonic die, wherein a width of the silicon substrate is greater than a width of the dielectric layer or a width of the electronic die.

20. The semiconductor device of claim 19, wherein:

the photonic die comprises a waveguide, the waveguide is positioned below the dielectric layer, and the semiconductor device further comprises a grating coupler defined by recesses in the waveguide.

* * * * *